Patented Dec. 28, 1948

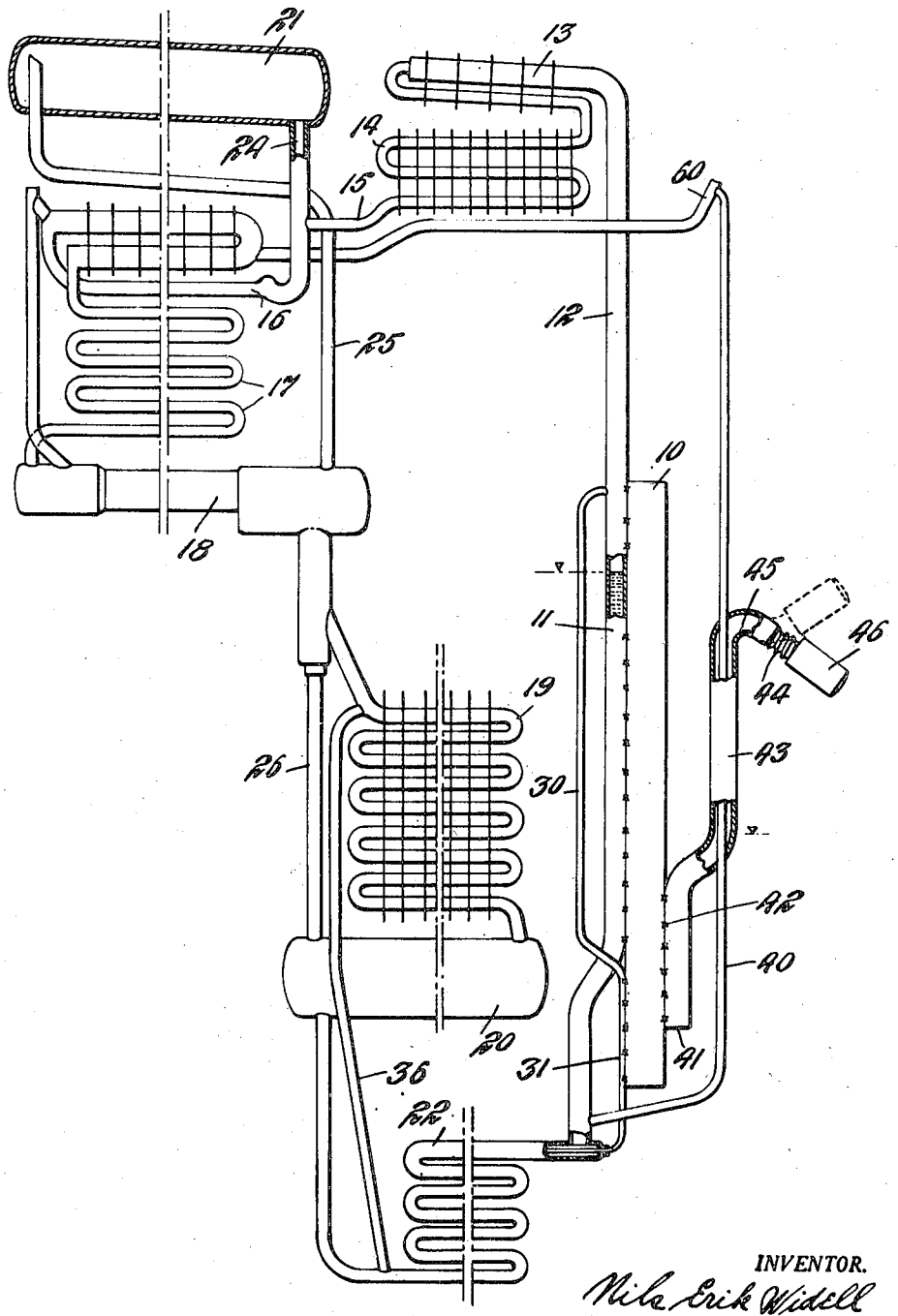

2,457,334

UNITED STATES PATENT OFFICE 2,457,334

CORROSION INHIBITORS IN REFRIGERATION SYSTEM

Nils Erik Widell, Stockholm, Sweden, assignor to Aktiebolaget Elektrolux, Stockholm, Sweden, a corporation of Sweden Application September 29, 1944, Serial No. 556,313
In Sweden November 4, 1943

8 Claims. (Cl. 62—119.5)

My invention relates to refrigeration and more particularly to absorption refrigerators of the pressure equalized type, and it is an object of my invention to provide corrosion protective means in such refrigerators.

In the drawing a hermetically closed absorption refrigeration system of the pressure equalized type is shown diagrammatically.

Referring to the figure the refrigeration system includes a generator 11, a rectifier 13 and an air cooled condenser 14. The generator is provided with a flue 10 and is arranged to be heated by a liquid fuel burner, a gas flame or an electric heater not shown in the drawing. The generator 11 and an absorber 19 are interconnected by members including an absorber vessel 20 and a liquid heat exchanger 22 for circulation of absorption liquid therethrough and therebetween. The circulation of the absorbent is affected by a vapour lift conduit 30 which is connected in a zone 31 in heat exchange relation to the flue 10. The generator 11 is connected by a conduit 12 to the rectifier 13. The condenser 14 is connected by conduits 15 and 16 to the upper part of the evaporator 17 for flow of liquid from the condenser to the evaporator. The evaporator is located in the upper part of a refrigerator storage compartment not shown in the drawing. The evaporator 17 and the absorber 19 are interconnected by members including a gas heat exchanger 18 and a conduit 23 for circulation of gas therethrough and therebetween. The absorber is air cooled. A pressure vessel 21 is connected to the gas heat exchanger 18 by a conduit 25 and further to the upper part of the evaporator 17 by means of a drainage conduit 24. Weak solution is supplied to the absorber by a conduit 36.

The system is made of iron and contains refrigerant fluid, a liquid absorbent therefor and an inert gas. These fluids may be for example, ammonia, water and hydrogen, respectively. Ammonia vapour is distilled from solution by overheating the generator 11. Ammonia vapour is condensed to liquid in the condenser 14. Liquid ammonia evaporates and diffuses into hydrogen in the evaporator 17, producing refrigerating effect. Ammonia vapour is absorbed out of the gas into solution in the absorber 19. The manner of operation of a refrigerating apparatus of this type is well known and will not be described more fully herein.

For the purpose of defrosting the evaporator 17 I further provide an auxiliary vapour lift conduit 40, the lower end of which communicates with a lower part of the boiler tube 11. The pump conduit 40 terminates at its upper end in a conduit 60 or in another part of the system from which liquid lifted by the auxiliary pump may flow into evaporator 17.

Differing from the generator 11 and the liquid pump 30, the vapour lift pump 40 is not arranged in direct heat conductive relation to the heating tube 10. The heat supply to auxiliary pump is obtained by intermedium of an hermetically closed heat transfer system. This system includes a tube, the lower part 41 of which is closed at its end and arranged in heat conductive relation to the flue 10, for example, along a welded zone 42. The upper part 43 of the heat transfer system is arranged in heat conductive relation to the vapour lift pump 40, for example, by welding or, as shown in the drawing, by arranging said pump pipe within the heat transfer system. The upper end 45 of the tube is inclined as shown in the drawing and by intermedium of a flexible pipe 44 connected to a condenser vessel 46, so that the system is hermetically closed. Due to the flexible pipe 44, the vessel 46 may be lifted into the position designated in the drawing by dotted lines.

As a heat transfer medium the system includes a specific quantity of xylol, kerosene or the like having a high boiling point. The quantity of said liquid is such that when distilled from the heat receiving part of the system to the condenser vessel 46 a transmittance of heat by vapour lift pipe 40 to the evaporator 17 is obtained, which is sufficient for removal of the frost from the evaporator. If vessel 46 is kept in the position indicated in the drawing, the condensate of the heat transfer medium is not able to flow back into the boiler of the system but is accumulated in the vessel 46. Accordingly, after a certain interval of time all heat transfer medium is accumulated, the heated part of the system thus containing superheated vapour only. Due to this fact the transfer of heat to the auxiliary pump 40 is interrupted, and as a result the defrosting period of the refrigerator is automatically terminated. When a new period of defrosting is to be initiated, the vessel 46 is emptied into the boiler. In order to prevent an uncontrollable overboiling of liquid into the vessel 46, an auxiliary medium may be introduced into the system, for example, a second liquid having a lower boiling point than that of the heat transfer medium. As an auxiliary medium there may be used an ethyl alcohol.

Though all oxygen is evacuated before the refrigerating system is filled, there appear certain chemical processes in the system which may cause disturbances in the operation of the apparatus. In order to prevent such chemical processes, I include in the system according to my invention corrosion protective means of the type which are soluble not only in the absorbent but also in the refrigerant or at least in a strong solution of refrigerant in absorbent liquid. Further, according to my invention I prefer to include in the apparatus means of the type by the disintegration of which there is only formed soluble or gaseous products. In a refrigeration system containing water, ammonia and hydrogen I use an alkali nitrite, such as sodium nitrite ($NaNO_2$) or potassium nitrite ($KNO_2$). In certain cases there may be used ammonium nitrite ($H_4NNO_2$). These substances are soluble in ammonia and in water and in a water solution of ammonia with a high ammonia concentration. As an example I wish to mention that the weak solution flowing to the absorber may have an ammonia concentration of about 18%. The strong solution flowing to the pump 31 may have a concentration of about 22% ammonia. The absorbent liquid elevated by the auxiliary pump 40 in the evaporator will meet pure ammonia or an ammonia solution having an ammonia concentration from 90 to 98% without the nitrite being precipitated.

Generally there will be formed ammonium nitrite, when a solution of, for example, sodium nitrite and a water solution of ammonia are mixed. Further the ammonium nitrite, however, will slowly be disintegrated, said process proceeding very rapidly at high temperatures. As a result of this process there will be formed nitrogen and water. Due to the high pressure of ammonia in the refrigerating system the process is delayed and accordingly most of the nitrite enclosed in the apparatus is active as corrosion protective substance. In order to delay the disintegration of the nitrite furthermore, I prefer to add small quantities of alkali such as sodium hydroxide (NaOH).

In certain cases it may be preferable to add small quantities of other corrosion protective means, such as chromate of sodium ($Na_2CrO_4$). In order to prevent a precipitation of this substance by ammonia I prefer a concentration of chromate less than 0.05%. It may in many cases be sufficient to have the system washed by a weak solution of chromate before filling the absorbent into the apparatus, the iron walls thus having been passivated to a suitable extent before the filling operation.

As to the quantities of the corrosion protective means and auxiliary means I wish to mention that the absorbent may have a concentration of sodium nitrite of about 1 to 5%, and when used a concentration of sodium hydroxide of about 0.1 to 1%, and if used a concentration of sodium chromate of less than 0.05%.

My invention may be changed and modified in many respects within the scope of the invention which is set forth in the following claims.

What I claim is:

1. In the art of refrigeration employing an absorption refrigerating system utilizing ammonia as a refrigerant and water as an absorbent, that improvement in inhibiting corrosion in the system which consists in periodically lifting absorption solution containing an alkali nitrite as a corrosion inhibiting substance into an upper part of the system, which solution flows by gravity downward through parts of the system which are not normally supplied with absorption solution.

2. The improvement as set forth in claim 1 in which the alkali nitrite is sodium nitrite.

3. The improvement as set forth in claim 1 in which the alkali nitrite is potassium nitrite.

4. The improvement as set forth in claim 1 in which the alkali nitrite is ammonium nitrite.

5. In the art of refrigeration employing an hermetically sealed absorption refrigeration system utilizing ammonia as a refrigerant and water as an absorbent and in which solid chemical reaction products are apt to interfere with the proper operation of the system, that improvement which consists of adding from 1 to 5% of an alkali nitrite to the aqueous ammonia solution in the system to inhibit corrosion and produce only soluble or gaseous reaction products.

6. In the art of refrigeration employing an hermetically sealed absorption refrigeration system utilizing ammonia as a refrigerant and water as an absorbent and in which solid chemical reaction products are apt to interfere with the proper operation of the system, that improvement which comprises adding from 1 to 5 per cent of an alkali nitrite to the aqueous ammonia solution in the system to inhibit corrosion and produce only soluble or gaseous reaction products, and another substance to stabilize the nitrite and retard its disintegration in the system, such stabilizing substance being added in an amount insufficient to cause any disturbances in the system.

7. That improvement as set forth in claim 6 in which said stabilizing substance is sodium chromate.

8. That improvement as set forth in claim 6 in which said stabilizing substance is sodium hydroxide.

NILS ERIK WIDELL.

REFERENCES CITED

The following references are of record in the file of this patent:

UNITED STATES PATENTS

| Number | Name | Date |
|---|---|---|
| 1,960,040 | Widell | May 22, 1934 |
| 2,054,282 | Clarkson | Sept. 14, 1936 |
| 2,147,149 | Clapsadle | Feb. 14, 1939 |
| 2,297,666 | Wachter | Sept. 29, 1942 |

FOREIGN PATENTS

| Number | Country | Date |
|---|---|---|
| 117,816 | Australia | Dec. 9, 1943 |
| 118,306 | Australia | Apr. 6, 1944 |
| 552,966 | Great Britain | May 3, 1943 |